(12) United States Patent
Dhulst et al.

(10) Patent No.: US 12,492,150 B2
(45) Date of Patent: Dec. 9, 2025

(54) MAGNESIUMDIBORIDE POWDER-IN-TUBE WIRE

(71) Applicants: NV Bekaert SA, Zwevegem (BE); EPOCH WIRES LIMITED, Cambridge (GB)

(72) Inventors: Chris Dhulst, Oeselgem (BE); Jan Mestdagh, Oostrozebeke (BE); Mehmet Kutukcu, Cambridge (GB); Hans Vandeputte, Langemark (BE); Frank Verbeke, Zwevegem (BE)

(73) Assignees: NV BEKAERT SA, Zwevegem (BE); EPOCH WIRES LIMITED, Cambridge (GB)

( * ) Notice: Subject to any disclaimer, the term of this patent is extended or adjusted under 35 U.S.C. 154(b) by 1002 days.

(21) Appl. No.: 17/627,368

(22) PCT Filed: Jun. 23, 2020

(86) PCT No.: PCT/EP2020/067507
§ 371 (c)(1),
(2) Date: Jan. 14, 2022

(87) PCT Pub. No.: WO2021/008827
PCT Pub. Date: Jan. 21, 2021

(65) Prior Publication Data
US 2022/0259110 A1   Aug. 18, 2022

(30) Foreign Application Priority Data

Jul. 18, 2019   (EP) .................................... 19250011

(51) Int. Cl.
*C04B 35/58* (2006.01)
*C04B 35/626* (2006.01)
(Continued)

(52) U.S. Cl.
CPC .. *C04B 35/58057* (2013.01); *C04B 35/62625* (2013.01); *H01B 1/02* (2013.01);
(Continued)

(58) Field of Classification Search
CPC ................... C04B 35/62625; C04B 35/58057
See application file for complete search history.

(56) References Cited

U.S. PATENT DOCUMENTS

| | | | |
|---|---|---|---|
| 2002/0173428 A1 | 11/2002 | Thieme et al. | |
| 2011/0224085 A1* | 9/2011 | Karau | H10N 60/0856 505/433 |
| 2015/0352637 A1* | 12/2015 | Shibuya | H01G 9/0525 205/322 |

FOREIGN PATENT DOCUMENTS

WO   2017/064471   4/2017

OTHER PUBLICATIONS

Yamada et al. "Effect of aromatic hydrocarbon addition on in situ powder-in-tube processed MgB2 tapes." Supercond. Sci. Technol. 19 (2006) 175-177. (Year: 2006).*

(Continued)

*Primary Examiner* — Paul A Wartalowicz
(74) *Attorney, Agent, or Firm* — Wenderoth, Lind & Ponack, L.L.P.

(57) ABSTRACT

A magnesiumdiboride ($MgB_2$) powder-in-tube (PIT) wire has a cross-section showing —voids, —magnesiumdiboride, and —oxides, as measured by energy-dispersive X-ray spectroscopy. Oxides are located at the borders between the voids and the magnesiumdiboride. The $MgB_2$ PIT wire has a higher degree of superconductivity.

8 Claims, 4 Drawing Sheets

(51) Int. Cl.
- *H01B 1/02* (2006.01)
- *H01B 12/00* (2006.01)
- *H01B 13/00* (2006.01)

(52) U.S. Cl.
CPC ............ *H01B 12/00* (2013.01); *H01B 13/00* (2013.01); *C04B 2235/3206* (2013.01); *C04B 2235/3808* (2013.01); *C04B 2235/85* (2013.01)

(56) References Cited

OTHER PUBLICATIONS

Extended European Search Report issued Jan. 31, 2020 in corresponding European Patent Application No. 19250011.4.
Birajdar et al., "Quantitative electron microscopy and spectroscopy of $MgB_2$ wires and tapes", Supercond. Sci. Technol., 2008, vol. 21, pp. 1-20.
Kario et al., "Ex situ $MgB_2$ barrier behavior of monofilament in situ $MgB_2$ wires with Glidcop® sheath material", Supercond. Sci. Technol., 2010, vol. 23, pp. 1-9.
International Search Report and Written Opinion of the International Searching Authority issued Sep. 7, 2020, in International (PCT) Application No. PCT/EP2020/067507.

\* cited by examiner

MAGNESIUMDIBORIDE POWDER-IN-TUBE WIRE

TECHNICAL FIELD

The invention relates to a magnesiumdiboride powder-in-tube wire, more particularly to an in situ magnesiumdiboride powder-in-tube wire used as superconductive wire. The invention also relates to a way of manufacturing such a wire.

Background Art

WO 2017/064471 A1 discloses an in situ magnesiumdiboride powder-in-tube wire and a way of making this wire.

A powder-in-tube wire is made by the known powder-in-tube (PIT) technology. According to this technology, precursor magnesium powder and boron powder is packed in one or more metal tubes. The tubes are mechanically deformed by drawing, swaging, rolling and heat treatment in order to obtain the final magnesiumdiboride powder-in-tube superconductive wire.

In the ex situ route magnesiumdiboride powder that has already reacted is used as starting material.

In the in situ route the unreacted powders of magnesium and boron and possible dopant powders are used as starting material.

WO 2017/064471 A1 discloses the use of a carrier liquid that is chemically inert with respect to either magnesium powder or boron powder or both. The liquid is not oxidizing to magnesium powder and/or not oxidizing to boron powder. The liquid carrier together with the powders forms a slurry that is continuously fed in the channel of the tube or tubes. Thereafter a heating is applied under a non-oxidizing atmosphere with as result a solid residue. By mixing the powders into an inert carrier liquid, problems with oxidation, moisture absorption and so on are reduced and the powders are mixed to a better homogeneity level.

DISCLOSURE OF INVENTION

A general aspect of the invention aims at further increasing the degree of superconductivity.

A more specific aspect of the invention aims at locating oxygen or oxides in a superconductor wire at positions that are less harmful for superconductivity.

Another particular aspect of the invention aims at further reducing the content of oxygen or oxides in a superconductor wire.

Still another aspect of the invention is to allow the use of larger magnesium powders without decreasing the conductivity.

Yet another aspect of the invention is to increase the normal zone propagation velocity of a superconductor wire.

According to a first aspect of the invention, there is provided a magnesiumdiboride powder-in-tube wire having a cross-section showing
  voids or cavities,
  magnesiumdiboride, and
  oxides,
wherein oxides are located at the borders between the voids and the magnesiumdiboride.

The visualization of the voids, magnesiumdiboride and oxides can be realized by means of energy-dispersive X-ray spectroscopy.

The magnesiumdiboride powder-in-tube wire is preferably an in situ powder-in-tube wire.

A major amount of present oxygen has reacted with the highly reactive magnesium and has formed magnesiumoxide. As a major part of this magnesiumoxide is present at the borders between the unavoidable voids or cavities and the magnesiumdiboride, very little oxygen is still present in the magnesiumdiboride crystalline material.

Therefor the magnesiumdiboride has stronger grain boundaries since it is only contaminated with oxygen to a very limited extent.

Since the path of the electrical current is via the magnesiumdiboride a higher critical current $I_c$ can be obtained.

The stronger grain boundaries in the magnesiumdiboride matrix lead to an improved grain connectivity and to a better bending performance. This means that a smaller radius of bending is possible for a same wire diameter, which facilitates the final coil making.

Another advantage is that the content and location of the magnesiumoxide is not dependent upon the size of the magnesium powders. As a result, larger magnesium powders in the range of 100 µm to 350 µm may be used as starting material, which reduces the cost of the starting material and reduces the risk of explosion. Indeed magnesium is known to have a high degree of reactivity and it is known that the smaller the size of the magnesium powders the greater the risk for ignition.

Yet another advantage is that the longitudinal normal zone propagation velocity is higher than in prior art magnesiumdiboride wires. The longitudinal normal zone propagation velocity determines the speed of propagation of a local hot spot along the wire length. A high longitudinal normal zone propagation velocity means that the length of the normal resistive zone in a superconductor expands quickly, resulting in a faster increase of the resistive voltage that is measured at the coil ends. The faster this measurement can be done, the quicker an imminent quench can be detected and the quicker protection schemes can be triggered for safeguarding and protecting the magnet against local overheating and irreversible damage.

It is believed that a more homogeneous magnesiumdiboride matrix with a lower oxygen concentration will lead to a higher n-value and, hence, to a higher normal zone propagation velocity. The n-value is a commonly used parameter to measure the homogeneity of a conductor. The higher the n-value the higher the normal zone propagation velocity.

Preferably more than 60%, most preferably more than 70%, 80%, 90% or 95%, of the present oxides are located at the borders between the voids and magnesiumdiboride. Due to the high reactivity of magnesium, a major part of these oxides are magnesium oxides. The magnesium oxides are mainly MgO.

Even in case the slurry method of WO 2017/064471 A1 is applied, oxides cannot be avoided. Magnesium is one of the most reactive elements towards oxidation. Hence, oxidation takes place at the surface of the magnesium powders and also of the boron powders. Magnesium oxides (mainly MgO) and boron oxides ($B_2O_3$) are formed. Magnesium powder or boron powder or both and possible dopants as SiC are added to a first carrier liquid that is chemically inert to at least one of the powders.

One way of further reducing the oxides in the final PIT wire is that after forming of a first slurry with the first carrier liquid and at least one of the powders, the slurry is washed. This washing step removes a substantial part of the magnesium oxides and/or the boron oxides and/or oxides formed with dopant material. A second carrier liquid that may be equal to or different from the first carrier liquid is then added to the remaining residue to form a second slurry. The result is that the total amount of oxygen and oxides is less in this second slurry than in the first slurry. However, there are still magnesium oxides in the second slurry. Magnesium oxides are present next to metallic magnesium particles. Both are relatively big in comparison to the size of the boron particles. When later on in the process, the heating treatment starts to form the magnesiumdiboride, the heated metallic magnesium has little problems in infiltrating in the boron powder to react and form magnesiumdiboride. The majority of oxides are left behind at the border region between the voids and the magnesiumdiboride matrix. Little oxide is able to penetrate in the magnesiumdiboride matrix and to affect the inter-grain connectivity of the magnesiumdiboride particles.

In addition to the washing step or as an alternative to the washing step, a controlled chemical reaction with the oxides in the slurry may reduce the content of oxygen in the final PIT wire, for example by use of a solvent.

In a particular preferable embodiment and as a result of the washing step, the magnesiumdiboride powder-in-tube wire has an amount of oxygen less than 5 weight percent (wt %), for example less than 4 wt %, preferably less than 3 wt %, most preferably less than 2.5 wt %. The amount of oxygen may be determined by means of scanning electron microscopy and energy dispersive X-ray technique taken over a statistically significant part of the cross-section of the superconducting material, leaving out the area of voids and cavities, so measuring or calculating outside the area of voids or cavities.

In another particular and preferable embodiment of the invention, there is provided a multi-wire comprising two or more in situ magnesiumdiboride powder-in-tube wires. These wires can be bundled together or, preferably, can be twisted.

According to a second aspect of the present invention, there is provided a process for making an in situ magnesiumdiboride powder-in-tube wire. The process comprises the following steps:
  a) mixing magnesium powder and/or boron powder in a first carrier liquid to create a first slurry;
  b) washing the first slurry whereby magnesium oxides and/or boron oxides are washed away leaving a residue of magnesium powder, boron powder and remaining oxides;
  c) adding a second carrier liquid to the residue to create a second slurry;
  d) adding the second slurry to a preformed metallic sheath;
  e) closing the preformed metallic sheath to form a tube.

Preferably, step c) is done without drying the residue.

Preferably the second carrier liquid is equal to the first carrier liquid.

BRIEF DESCRIPTION OF FIGURES IN THE DRAWINGS

FIG. 3b shows energy dispersive X-ray mapping of oxygen of the prior art ex situ $MgB_2$ wire in the scanned area of FIG. 3a.

FIG. 4b shows energy dispersive X-ray mapping of oxygen of the prior art in situ $MgB_2$ wire in the scanned area of FIG. 4a.

FIG. 5b shows energy dispersive X-ray mapping of oxygen of the invention in situ $MgB_2$ wire in the scanned area of FIG. 5a.

MODE(S) FOR CARRYING OUT THE INVENTION

The first steps of making an in situ $MgB_2$ PIT wire relate to the preparing of a slurry.

A first slurry is prepared by mixing B powder and/or Mg powder in a first carrier liquid. As mentioned before, there is no need to use small Mg powders. Mg powders with sizes ranging from 100 µm to 350 µm are perfectly suitable. The B powders may be of a nano to micro size. Dopant powders like SiC may be added. Examples of a suitable first carrier liquid are liquid hydrocarbon, ethyl alcohol, acetone, methyl acetate, and ethyl-acetate. Examples of a suitable second carrier liquid are alcohol and acetone.

This first slurry is then washed. The washing process removes not only the fluid substance but also a substantial part of the present oxides such as MgO and/or $B_2O_3$. A residue of B powders and Mg powders and possible dopant powders and a reduced amount of oxides remains.

After the washing step, a second liquid carrier is added to the residue to form a second slurry. This second liquid carrier can be different from the first liquid carrier, but is preferably the same.

Figure 1:
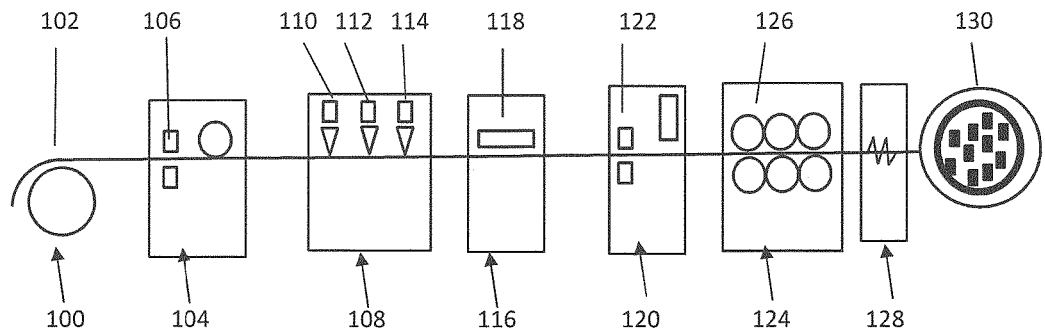
FIG. 1 shows schematically first steps of making a single in situ magnesiumdiboride powder-in-tube wire.

Reference is now made to FIG. 1, which shows schematically the first steps of making a single in situ $MgB_2$ PIT wire.

Step 100 is unwinding of a metallic or bi-metallic flat sheet 102. The sheet can be of Cu, Ni, Nb, Ti, Fe, stainless steel, Cu—Ni, Monel, Ag—Mg and Nb—Ti or of any combination of them. Preferably a bi-metallic sheet out of two metals is used or two sheets of different metals are used. One of the two metals is electrically more conducting than the other one. A preferred example is a combination of copper with steel.

Step 104 is the preforming of the metallic sheet 102, for example in a U-form by means of preforming elements 106. The U-form is suitable for receiving the second slurry with the various powders.

Step 108 is delivering the second slurry with the powders. This can be done in one step where all powders, B, Mg and any dopant powders are added via one nozzle 110 to the deformed sheet 102. Alternatively, the various powders in a separate second slurry can be added separately via nozzles 110, 112 and 114.

Step 116 is preconditioning the powders by means of a heater 118.

Step 120 is the closure of the metallic sheet 102 by means of preformers 122 and a welding operation to form a closed metallic tube.

Step 124 is the reduction of cross-section of the tube to form a single wire. This reduction can be done by means of rollers 126 or by means of a series of dies.

Step 128 is a quality control step.

The result of this first series of manufacturing steps 100, 104, 108, 116, 120, 124 and 128 is a single in PIT wire 130 with unreacted powders B and Mg and possible dopant powders inside a metallic sheet.

Figure 2:
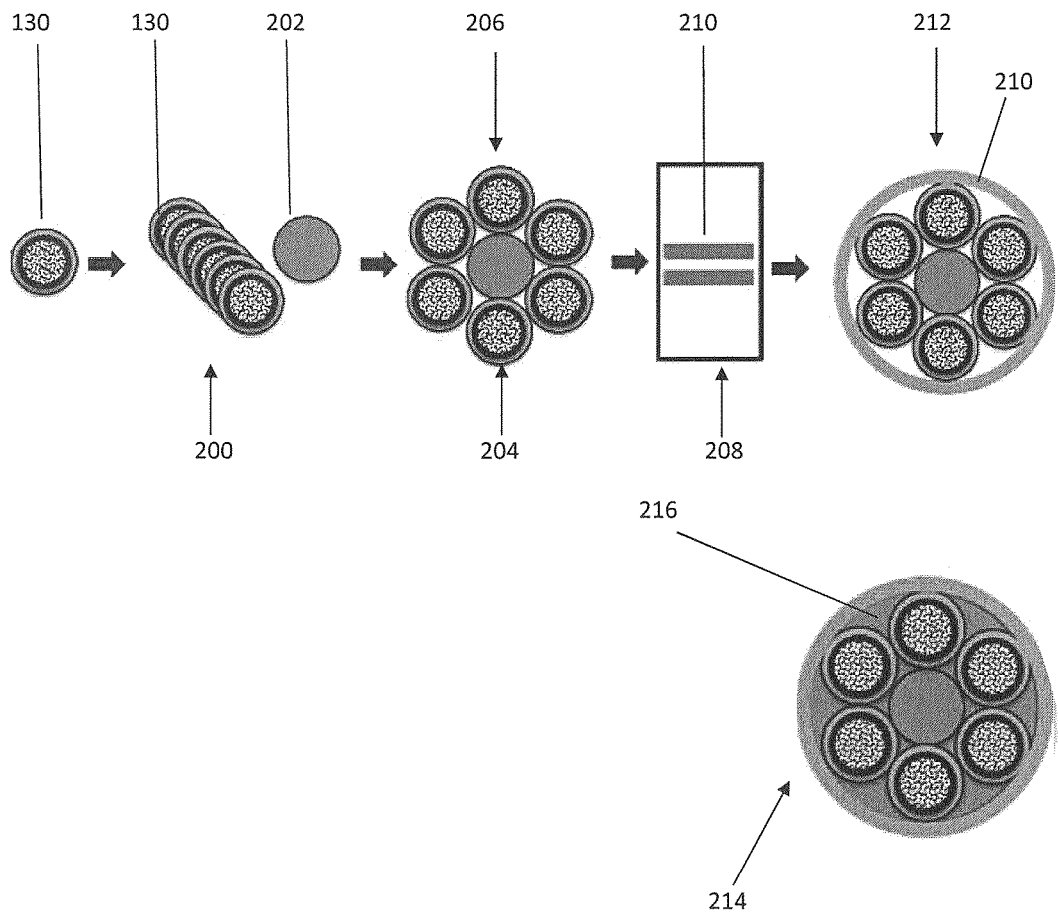
FIG. 2 shows schematically following steps of making a multifilament wire.

FIG. 2 illustrates the various steps for making a multifilament wire.

A single PIT wire 130 forms the main starting product for making a multifilament wire.

In step 200 various single PIT wires 130 are put next to each other and next to a copper or aluminium wire 202 ready to be unwound and twisted.

Step 204 is the twisting process where the various PIT wires 130 are twisted around the copper or aluminium wire 202 to form a twisted structure.

In step 208 elongated insulation material 210 is wrapped or braided around the twisted structure to form a consolidated multifilament 212.

Thereafter, preferably in line with the twisting and wrapping or braiding process, the consolidated multifilament 212 is subjected to a heat treatment in order to react the Mg with the B and to form $MgB_2$.

In a final step 214 the multifilament 212 is impregnated with resin 216.

Energy-dispersive X-ray spectroscopy has been applied on several samples of two prior art $MgB_2$ PIT superconductor wires and on several samples of an invention $MgB_2$ PIT superconductor wire.

All samples were cut by a plasma of argon ions with a cross-section polisher of the type JEOL (JSM 09010). After making a clean cross-section, the samples were put on a sample holder for analysis and stored in a vacuum chamber until analysis could start. This was done to avoid oxidation by air.

Several analyses were carried out in a JEOL 7200F equipped with an Oxford X-max EDX detector from Oxford Instruments with a 80 $mm^2$ window. The software used is Oxford Aztec version 3.3.

All samples were measured on process time 5 with a fixed number of counts/spectrum of 500000. All elements other than B, O or Mg were removed from the spectrum by eliminating them in the Oxford Aztec software.

The acceleration voltage used in the method was 5 kV or 15 kV.

The results are in weight percentage (wt %). The measured values have an accuracy of 0.1 wt %.

Prior Art Wire 1: Ex Situ $MgB_2$ PIT Wire

Figure 3A:
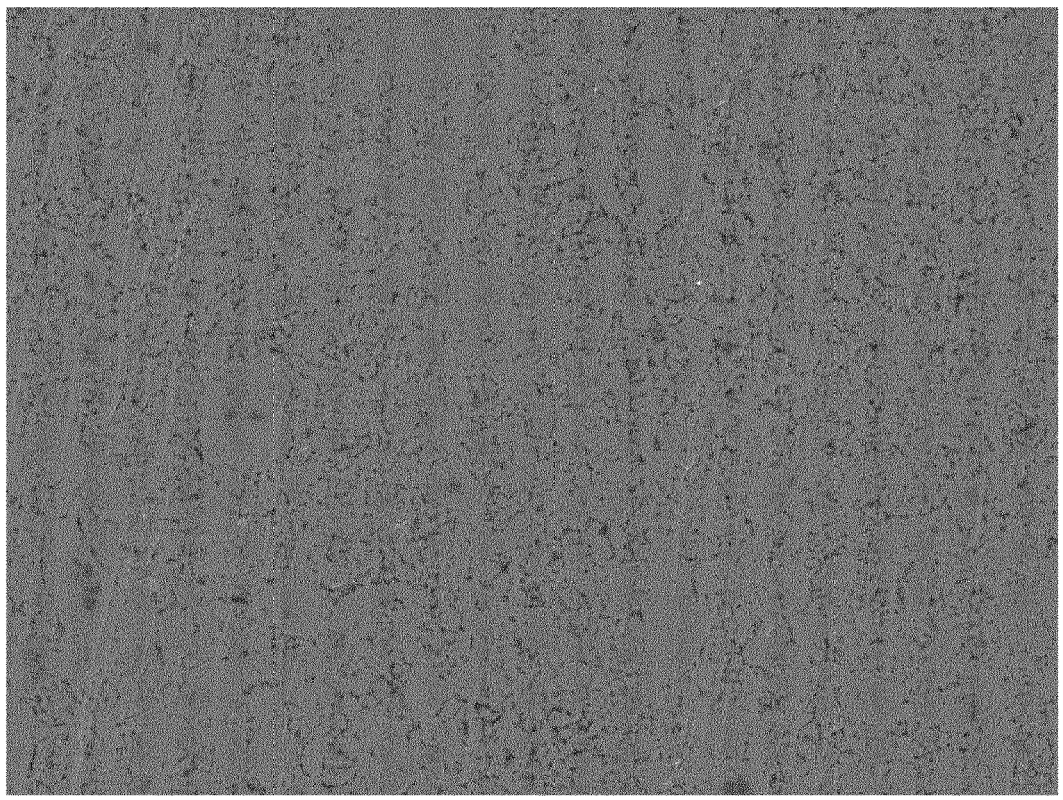
FIG. 3a shows a scanned area of a prior art ex situ $MgB_2$ wire.
Figure 3B:
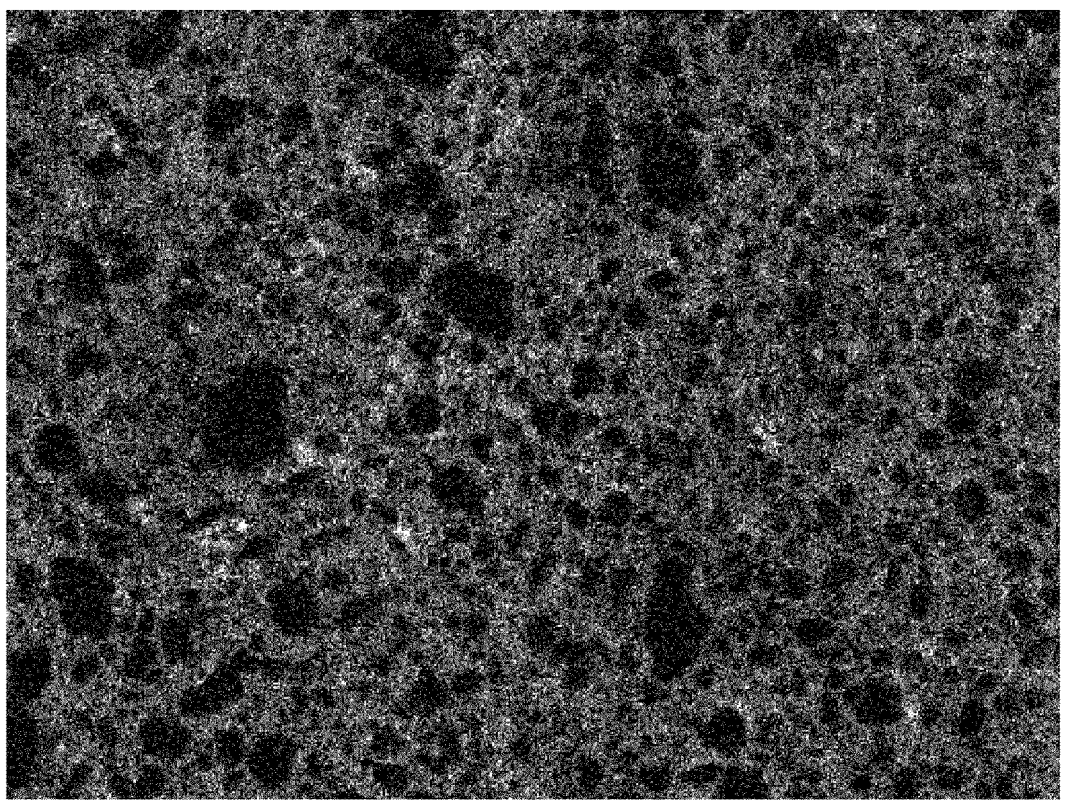

FIG. 3a shows the scanned area of an ex situ $MgB_2$ PIT wire. FIG. 3b shows the energy dispersive X-ray mapping of oxygen of the prior art ex situ $MgB_2$ wire in the scanned area of FIG. 3a. The white spots in FIG. 3b correspond to oxygen.

The oxygen is distributed homogeneously over the cross-section area and is thus largely present in the $MgB_2$ matrix.

The voids or cavities are widely spread over the whole cross-section.

Measurement of pure material without including a certain number of cavities was not possible.

Nine different samples were measured with different magnification (2000×, or 10000×) and with different acceleration voltage (5 kV or 15 kV). These nine samples show following ranges:
B: 51.0 wt %-52.2 wt %
O: 6.8 wt %-8.7 wt %
Mg: 40.5 wt %-42.2 wt %

Prior Art Wire 2: In Situ $MgB_2$ PIT Wire

Figure 4A:
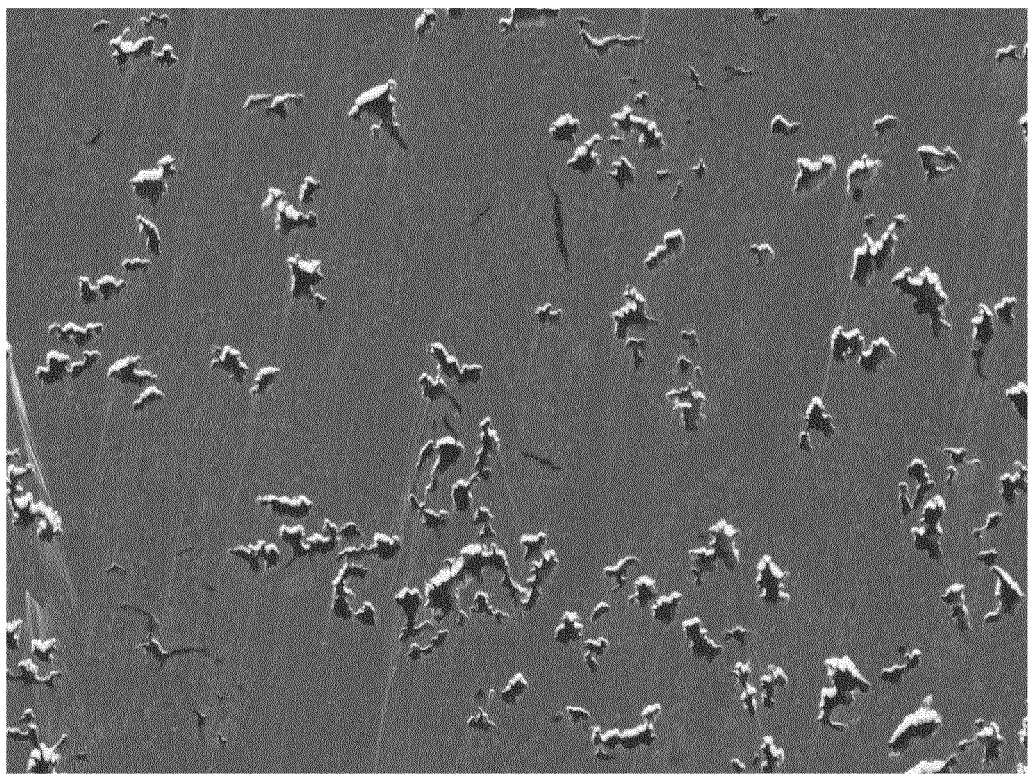
FIG. 4a shows a scanned area of a prior art in situ $MgB_2$ wire.
Figure 4B:
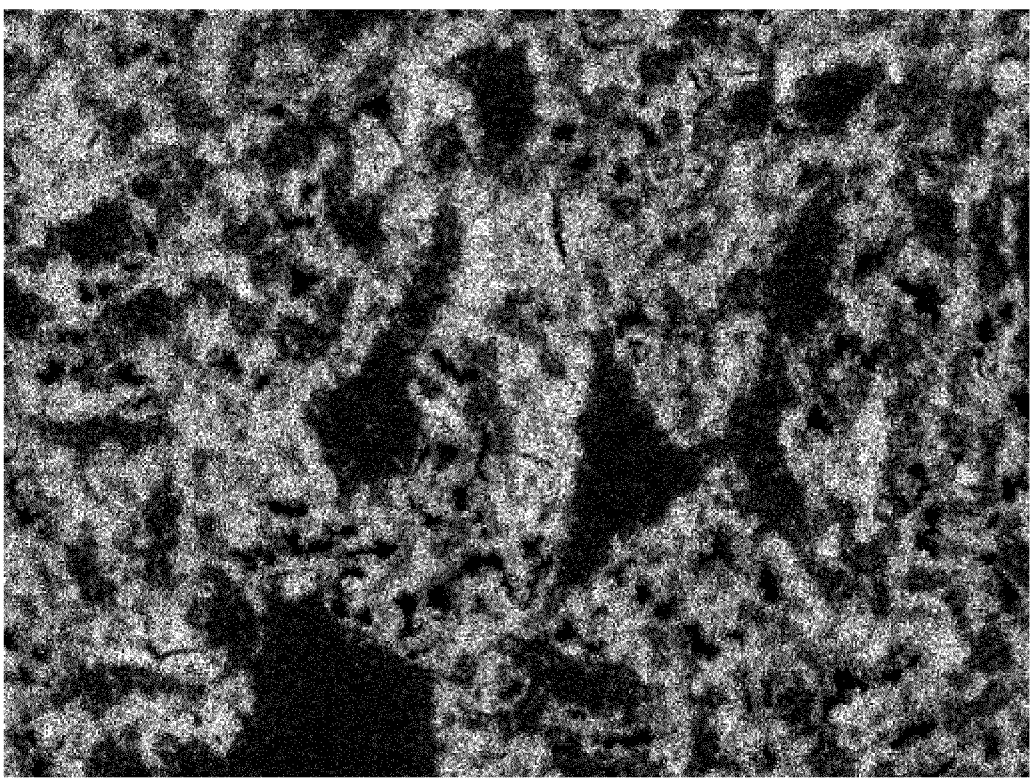

FIG. 4a shows a scanned area of a prior art in situ $MgB_2$ wire. FIG. 4b shows energy dispersive X-ray mapping of oxygen of the prior art in situ $MgB_2$ wire in the scanned area of FIG. 4a.

The white spots in FIG. 4b correspond to oxygen. The oxygen is distributed in oxygen right areas and oxygen poor areas, but the oxygen concentration cannot be linked to the cavities or the voids.

In contrast to prior art wire 1, it was possible here to do measurements with inclusion and exclusion of cavities.

Including the cavities and using an acceleration voltage of 15 kV and magnification of either 2000× or 10000×, following ranges were found over four samples:
B: 40.9 wt %-50.3 wt %
O: 13.8 wt %-23.4 wt %
Mg: 29.4 wt %-38.3 wt % These wide ranges confirm the inhomogeneous distribution of oxygen.

Excluding the cavities and using an acceleration voltage of either 5 kV or 15 kV, following ranges were found:
B: 29.9 wt %-57.3 wt %
O: 1.6 wt %-34.1 wt %
Mg: 33.8 wt %-42.6 wt %

Again, these wide ranges confirm the inhomogeneous distribution of oxygen.

Invention In Situ $MgB_2$ PIT Wire

Figure 5A:
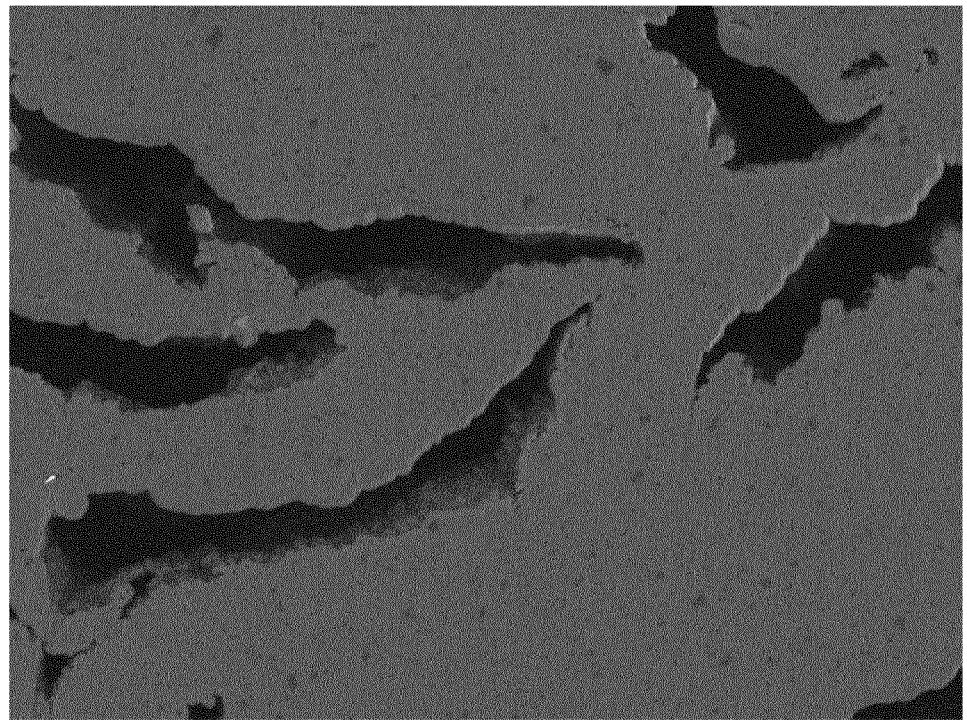
FIG. 5a shows a scanned area of an invention in situ $MgB_2$ wire.
Figure 5B:
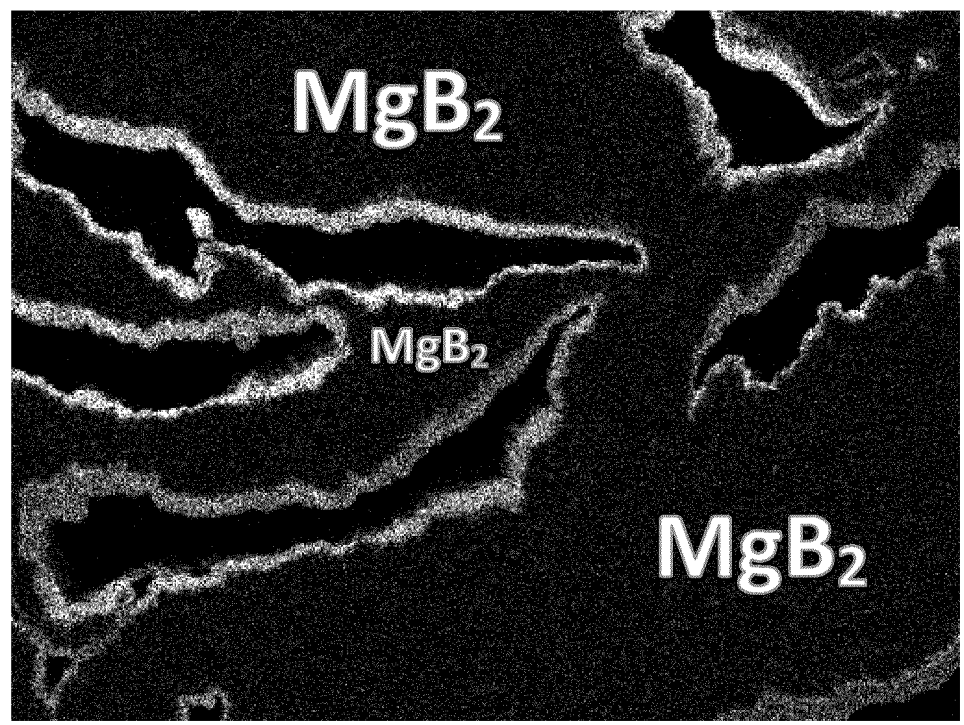

FIG. 5a shows a scanned area of an invention in situ $MgB_2$ wire. FIG. 5b shows an energy dispersive X-ray mapping of oxygen of the invention in situ $MgB_2$ wire in the scanned area of FIG. 5a. The white spots in FIG. 5b correspond to oxygen. The oxygen is concentrated at the border between the $MgB_2$ matrix and the cavities.

Including the cavities and using an acceleration voltage of 5 kV or 15 kV and magnification of either 2000×, following ranges were found over four samples:
B: 52.8 wt %-54.4 wt %
O: 6.2 wt %-8.4 wt %
Mg: 37.2 wt %-40.2 wt %

In comparison with prior art in situ $MgB_2$ PIT wire, these ranges are more narrow.

Excluding the cavities and using an acceleration voltage of 5 kV or 15 kV and varying magnification, following ranges were found:
B: 56.0 wt %-58.1 wt %
O: 0.9 wt %-2.3 wt %
Mg: 41.0 wt %-42.3 wt %

Here the ranges are also quite narrow. The very low amount of oxygen (always below 2.5 wt %) is remarkable and explains the advantages of the present invention.

A $MgB_2$ PIT wire according to the invention can be used in superconductors. The superconductor is preferably used in a superconducting magnet of a magnetic resonance imaging apparatus. A superconductor according to the invention may also be applied in magnetic levitating vehicles, superconducting electromagnetic propulsion ships, nuclear fusion reactors, superconducting generators, accelerators, electron microscopes, energy storing apparatus, and power cables.

The invention claimed is:

1. A magnesiumdiboride powder-in-tube wire having a cross-section comprising
   voids,
   magnesiumdiboride, and
   oxides,
wherein the oxides are located at borders between voids and the magnesiumdiboride, and
wherein the amount of the oxygen is less than 3 wt % when measured over a cross-section with the voids not included.

2. The wire according to claim 1,
   wherein the oxides are magnesium oxides.

3. The wire according to claim 2,
   wherein the magnesium oxides are MgO.

4. The wire according to claim 1, wherein the wire is an in situ magnesiumdiboride powder-in-tube wire.

5. The wire according to claim 1,
wherein more than 60% of the oxides present are located at the borders between the voids and the magnesium-diboride.

6. A multi-wire comprising two or more wires according to claim 1.

7. A process of making a wire according to claim 1, the process comprising the following steps:
   a) mixing magnesium powder and/or boron powder in a first carrier liquid to create a first slurry;
   b) washing the first slurry, whereby magnesium oxides and/or boron oxides are washed away leaving a residue of the magnesium powder and/or the boron powder and remaining oxides;
   c) adding a second carrier liquid to the residue to create a second slurry;
   d) adding the second slurry to a preformed metallic sheath; and
   e) closing the preformed metallic sheath to form a tube.

8. The process according to claim 7,
wherein the first carrier liquid is the same as the second carrier liquid.

* * * * *